United States Patent
Oke et al.

(10) Patent No.: US 10,007,379 B2
(45) Date of Patent: Jun. 26, 2018

(54) DISPLAY DEVICE WITH BUILT-IN TOUCH DETECTION FUNCTION

(71) Applicant: Panasonic Liquid Crystal Display Co., Ltd., Himeji-shi, Hyogo (JP)

(72) Inventors: Ryutaro Oke, Osaka (JP); Junichi Maruyama, Osaka (JP)

(73) Assignee: Panasonic Liquid Crystal Display Co., Ltd., Hyogo (JP)

(*) Notice: Subject to any disclaimer, the term of this patent is extended or adjusted under 35 U.S.C. 154(b) by 51 days.

(21) Appl. No.: 15/243,267

(22) Filed: Aug. 22, 2016

(65) Prior Publication Data

US 2016/0357329 A1    Dec. 8, 2016

Related U.S. Application Data

(63) Continuation of application No. PCT/JP2014/000931, filed on Feb. 21, 2014.

(51) Int. Cl.
*G06F 3/045* (2006.01)
*G06F 3/041* (2006.01)
(Continued)

(52) U.S. Cl.
CPC ........ *G06F 3/0416* (2013.01); *G02F 1/13338* (2013.01); *G02F 1/136286* (2013.01);
(Continued)

(58) Field of Classification Search
CPC ........ G06F 3/044; G06F 3/047; G06F 3/0412; G06F 3/0416; G06F 3/3648; G06F 3/13338; G02F 1/133514; G02F 1/136286
(Continued)

(56) References Cited

U.S. PATENT DOCUMENTS 5,517,207 A * 5/1996 Kawada .................. G09G 3/30
                                                              345/209
2005/0134538 A1* 6/2005 Aoki .................... G09G 3/3688
                                                              345/87
(Continued)

FOREIGN PATENT DOCUMENTS

JP        2008-304806        12/2008
JP        2011-222013        11/2011
(Continued)

*Primary Examiner* — Prabodh M Dharia
(74) *Attorney, Agent, or Firm* — Hamre, Schumann, Mueller & Larson, P.C.

(57) ABSTRACT

A display device with built-in touch detection function, the display device includes source lines, detection lines, common lines, gate lines, pixels, control elements, each applying to a corresponding pixel a voltage, a common line driving circuit including a pulse generator that sequentially drives the common lines, the pulse generator generating a first pulse signal for each of the common lines, a pulse compensator, the pulse compensator generating a second pulse signal based on the first pulse signal and the potential input from each of the common lines, the second pulse signal reducing a variation in potential at each of the common lines in response to a potential at each of the source lines, the pulse compensator outputting the second pulse signal to a corresponding common line, and a touch detector that detects a position specified by a user according to the second pulse signal.

10 Claims, 13 Drawing Sheets

(51) Int. Cl.
- *G02F 1/1333* (2006.01)
- *G06F 3/044* (2006.01)
- *G02F 1/1362* (2006.01)
- *G06F 3/047* (2006.01)
- *G09G 3/36* (2006.01)
- *G02F 1/1335* (2006.01)
- *G02F 1/1343* (2006.01)
- *G02F 1/1368* (2006.01)

(52) U.S. Cl.
CPC .............. *G06F 3/044* (2013.01); *G06F 3/047* (2013.01); *G06F 3/0412* (2013.01); *G09G 3/3648* (2013.01); *G02F 1/1368* (2013.01); *G02F 1/133514* (2013.01); *G02F 1/134309* (2013.01); *G02F 2001/133302* (2013.01); *G02F 2201/121* (2013.01); *G02F 2201/123* (2013.01); *G09G 3/3655* (2013.01); *G09G 2310/0291* (2013.01); *G09G 2310/06* (2013.01); *G09G 2320/0209* (2013.01); *G09G 2330/021* (2013.01)

(58) Field of Classification Search
USPC ............................. 345/87, 174, 204–212; 1/1
See application file for complete search history.

(56) References Cited

U.S. PATENT DOCUMENTS

| | | |
|---|---|---|
| 2007/0262966 A1 | 11/2007 | Nishimura et al. |
| 2008/0303770 A1 | 12/2008 | Oke et al. |
| 2010/0328239 A1* | 12/2010 | Harada ................ G06F 3/0412 345/173 |
| 2011/0128254 A1* | 6/2011 | Teranishi ................ G06F 3/044 345/174 |
| 2011/0163992 A1* | 7/2011 | Cordeiro ................ G06F 3/0416 345/174 |
| 2011/0242050 A1 | 10/2011 | Byun et al. |
| 2012/0062499 A1* | 3/2012 | Weaver ................ G06F 3/03545 345/174 |
| 2012/0113339 A1 | 5/2012 | Park et al. |
| 2013/0127794 A1* | 5/2013 | Todorovich .......... G09G 3/3466 345/204 |
| 2013/0321382 A1* | 12/2013 | Nagao .................. G09G 3/3696 345/212 |
| 2014/0104155 A1* | 4/2014 | Long ...................... G09G 3/344 345/107 |
| 2014/0132560 A1* | 5/2014 | Huang .................... G06F 3/044 345/174 |
| 2014/0253498 A1* | 9/2014 | Suzuki .................... G06F 3/044 345/174 |
| 2015/0022501 A1* | 1/2015 | Kita .................... G02F 1/13338 345/174 |
| 2015/0077393 A1* | 3/2015 | Kawachi ................ G06F 3/044 345/174 |
| 2015/0199051 A1* | 7/2015 | Noguchi ............. G02F 1/13338 345/174 |

FOREIGN PATENT DOCUMENTS

| | | | |
|---|---|---|---|
| JP | 2012-099081 | | 5/2012 |
| JP | 2012099081 A | * | 5/2012 |
| JP | 2013-084196 | | 5/2013 |
| JP | 2013-109095 | | 6/2013 |
| WO | 2006/043660 | | 4/2006 |

* cited by examiner

DISPLAY DEVICE WITH BUILT-IN TOUCH DETECTION FUNCTION

CROSS-REFERENCE TO RELATED APPLICATION

This application is a bypass continuation of international patent application PCT/JP2014/000931, filed: Feb. 21, 2014 designating the United States of America, the entire disclosure of which is incorporated herein by reference.

TECHNICAL FIELD

The present disclosure relates to a display device with built-in touch detection function.

BACKGROUND

From the viewpoint of display quality deterioration of a liquid crystal display device, it is necessary to prevent a crosstalk caused by a coupling noise to a common electrode. A technology for adjusting a voltage input to the common electrode on the basis of a detected voltage at the common electrode is called Vcom feedback. For example, a first prior art is known as a configuration of Vcom feedback control in the liquid crystal display device that includes neither a touch panel nor a touch function (See Japanese Unexamined Patent Application Publication No 2008-304806).

Nowadays, an electrostatic capacitance type touch panel is frequently used in a smartphone and a tablet terminal as a detection system of the touch panel. Various systems are studied as a combination system of the touch panel and a liquid crystal display panel. For example, a liquid crystal display device including the touch panel outside the liquid crystal display panel including a TFT (Thin film Transistor) substrate and a color-filter substrate is called an out cell. For example, a second prior art is known as a method for driving the Vcom feedback control in the out cell (See Japanese Unexamined Patent Application Publication No 2013-109095).

Specifically, in the second prior art, the common electrode and a liquid crystal layer are disposed between two glass substrates, and a sensor electrode for the touch panel is provided on an opposite side to the liquid crystal layer of one of the glass substrates. Because a variation in potential at the common electrode propagates to a potential at the sensor electrode, the second prior art discloses a Vcom feedback circuit that performs the feedback to the common electrode on the basis of a feedback signal input from the common electrode and a horizontal synchronizing signal in order to flatten a signal of the common electrode.

SUMMARY

The sensor electrode of the electrostatic capacitance type touch panel includes a driving electrode and a detection electrode. In the display device equipped with the out cell type touch panel, a thickness of the display device increases as a whole because the driving electrode and the detection electrode are provided outside the liquid crystal display panel. For the purpose of a low profile, it is conceivable that one of or both the driving electrode and the detection electrode are formed in the liquid crystal display panel.

For example, in the driving electrode and detection electrode of the touch panel, it is conceivable that the driving electrode is formed in the liquid crystal display panel, and that the driving electrode of the touch panel is also used as the common electrode of the liquid crystal display panel. In this case, in order to add resolution to the touch function, it is necessary that the common electrode (driving electrode) be disposed while divided into a plurality of electrically independent regions. For example, it is conceivable that the common electrode is disposed into a strip shape in a direction parallel to an extending direction of a gate line. However, in this configuration, the driving electrode (common electrode) is influenced by the coupling noise from a data signal input to each source line. The coupling noise occurring in the driving electrode (common electrode) propagates to the detection electrode, which leads to a problem in that a touch is hardly detected.

When the technology in the first prior art for always applying the voltage of the Vcom feedback control to the common electrode is applied to the configuration, the voltage of the Vcom feedback control is applied to the driving electrode even at a time period during which the signal of the touch sensor is applied to the driving electrode (common electrode) similarly to a time period (a time period during which the common electrode performs a display function) during which the signal of the touch sensor is not applied to the driving electrode. Therefore, an excessive voltage is applied to the driving electrode (common electrode) to have a bad influence on the touch detection.

An object of the present disclosure is to provide a low-profile display device with built-in touch detection function.

In one general aspect, the instant application describes a display device with built-in touch detection function. The display device includes a plurality of source lines extending along a first direction, a plurality of detection lines extending along the first direction, a plurality of common lines extending along a second direction different from the first direction, a plurality of gate lines extending along the second direction, a plurality of pixels, each pixel among the plurality of pixels receiving a video signal supplied from a corresponding source line among the plurality of source lines according to a video to be displayed, a plurality of control elements, each control element applying to a corresponding pixel a voltage based on the video signal and a potential to the plurality of common lines, a common line driving circuit including a pulse generator that sequentially drives the plurality of common lines, the pulse generator generating a first pulse signal for each of the plurality of common lines, a pulse compensator, the pulse compensator generating a second pulse signal based on the first pulse signal and the potential input from each of the common lines, the second pulse signal reducing a variation in potential at each of the common lines in response to a potential at each of the source lines among the plurality of source lines, the pulse compensator outputting the second pulse signal to a corresponding common line, and a touch detector that detects a position specified by a user according to the second pulse signal.

The above general aspect may include one or more of the following features. The pulse compensator may generate the second pulse signal according to a signal. The signal may be a sum of the first pulse signal and a signal that corresponds to another potential that is a variation in the potential at each of the common lines that is inverted, and may output the second pulse signal to each corresponding common line.

The common lines may be formed in a second layer between a first layer and a third layer. The detection lines may be formed in the first layer. The source lines may be formed in the third layer.

Each control element among the plurality of control elements may apply a voltage based on each of the video signals and the potential at each of the common lines to each of the pixels at a time period that is different from a detection time period in which the touch detector may perform detection based on the second pulse signal input to each of the common lines corresponding to the control element.

The pulse compensator may stop an operation to add the signal corresponding to the inverted signal to the first pulse signal at a detection time period when the touch detector performs detection.

The pulse compensator may stop the operation to add the signal corresponding to the inverted signal to the first pulse signal corresponding to each of the common lines at a part of a time period in which the control element except for each of the control elements corresponding to each of the common lines among the plurality of control elements may apply a voltage based on each of the video signals and the potential at each of the common lines to each of the pixels. The display device may further include a display region in which each of the pixels and each of the control elements are disposed in a region sectioned by the plurality of source lines and the plurality of gate lines, and a detection region that is different from the display region, each of the source lines and a portion of the plurality of common lines being disposed in the detection region while intersecting each other. The pulse compensator may output the second pulse signal based on a potential input from the common line disposed in the detection region.

The pulse compensator may include a signal selector that selects the second pulse signal based on the first pulse signal at a time period in which the first pulse signal is in low and high potentials, and selects a signal corresponding to a potential that is different from the potential at the second pulse signal at the time period, based on a power supply that is in one of the low and high potentials, at a different time period; and an output selector that selects one of the plurality of common lines based on timing of the first pulse signal, and outputs the signal selected with the signal selector to the selected common line. The pulse compensator may include a signal selector that selects the second pulse signal at a time period in which the first pulse signal is in low and high potentials based on the first pulse signal corresponding to each of the common lines. The signal selector may select a signal corresponding to a potential that is different from the potential at the second pulse signal at the time period, based on a power supply that is in one of the low and high potentials at a different time period, and outputs the selected signal to each corresponding common line.

DETAILED DESCRIPTION

First Exemplary Embodiment

Figure 1:
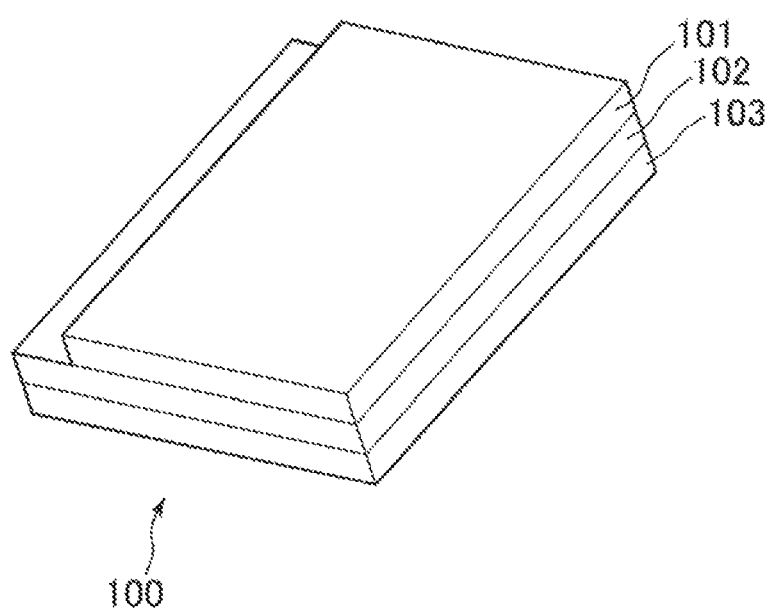
FIG. 1 is a view illustrating a schematic configuration of a display device with built-in touch detection function according to a first exemplary embodiment of the present disclosure.

FIG. 1 is a schematic diagram illustrating display device 100 according to a first exemplary embodiment of the present disclosure, display device 100 being integrally provided with a touch detecting function. As illustrated in FIG. 1, for example, display device 100 integrally provided with the touch detecting function includes color-filter substrate 101 in which a color filter (not illustrated) is provided and TFT substrate 102 that faces color-filter substrate 101 to be provided with a TFT (Thin film Transistor) and the like (not illustrated). Display device 100 includes a liquid crystal material (not illustrated) that is sealed in a region between TFT substrate 102 and color-filter substrate 101 and backlight 103 that is located which contacts with an opposite side to the color-filter substrate side of TFT substrate 102. FIG. 1 illustrates the schematic configuration of display device 100 integrally provided with the touch detecting function by way of example, but the first exemplary embodiment is not limited to the configuration in FIG. 1.

Figure 2:
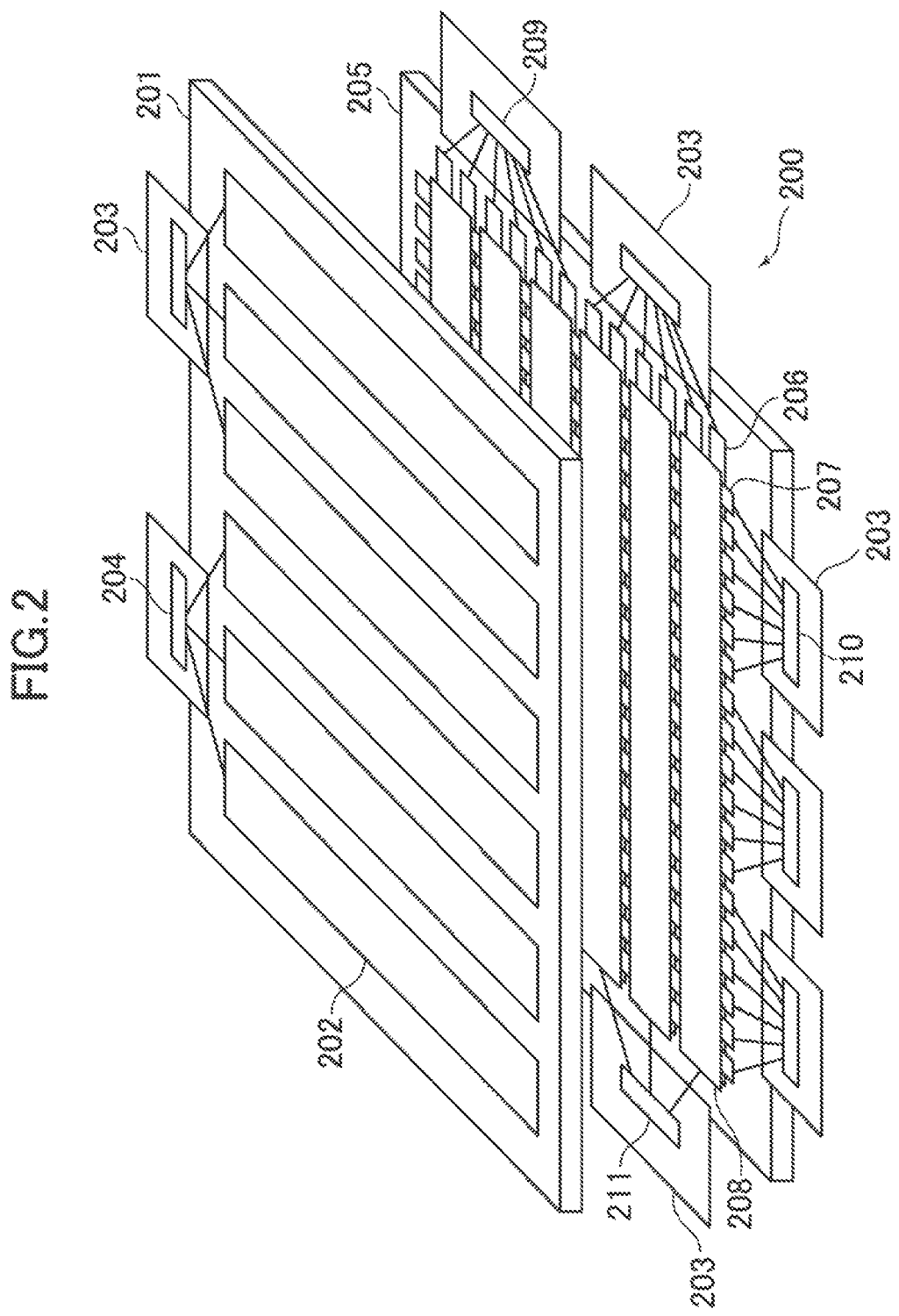
FIG. 2 is a view illustrating a schematic configuration of a panel according to the first exemplary embodiment of the present disclosure.

FIG. 2 is a view illustrating a schematic configuration of panel 200 including color-filter substrate 101 and TFT substrate 102 in FIG. 1. Each of gate driver 209, source driver 210, common line driving circuit 211, and sensor signal detecting circuit 204 has a configuration that synchronizes a circuit in order to control display and touch time periods (not illustrated).

Color-filter substrate 101 will be described below. As illustrated in FIG. 2, color-filter substrate 101 includes upper glass substrate 201, a plurality of sensor signal detection lines 202, FPC (Flexible Printed Circuit) 203, and sensor signal detecting circuit 204.

Sensor signal detection line 202 is arranged while extending in a first direction. Specifically, for example, sensor signal detection line 202 is arranged on a surface of upper glass substrate 201 opposite to TFT substrate 102 while extending in a vertical direction in FIG. 2. A plurality of FPCs 203 are arranged at an end of the surface of upper glass substrate 201 opposite to TFT substrate 102. Sensor signal detecting circuit 204 is disposed on FPC 203 while connected to each sensor signal detection line 202.

TFT substrate 102 will be described below. TFT substrate 102 includes lower glass substrate 205, gate line 206, source line 207, common line 208, FPC 203, gate driver 209, source driver 210, and common line driving circuit 211.

Gate line 206 and common line 208 are arranged while extending in a second direction different from the first direction. Specifically, for example, gate line 206 and common line 208 are arranged on one side of upper glass substrate 201 facing lower glass substrate 205 while extending in a horizontal direction in FIG. 2.

Source line 207 is arranged along the first direction. Specifically, for example, source line 207 is arranged on one side of lower glass substrate 205 facing upper glass substrate 201 while extending in the vertical direction in FIG. 2.

FPC 203 is provided on one side of lower glass substrate 205 facing TFT substrate 102, and connected to an end of the one side. Alternatively, each of color-filter substrate 101 and TFT substrate 102 does not include FPC 203, but each of sensor signal detecting circuit 204, gate driver 209, source driver 210, and common line driving circuit 211 may directly be disposed on corresponding upper glass substrate 201 or lower glass substrate 205.

Gate driver 209 is connected to a plurality of gate lines 206. Gate driver 209 outputs a gate signal to corresponding gate line 206 in response to a control signal from a timing control circuit. The gate signal becomes a high voltage at a gate scanning time period among one-frame time period, and becomes a low voltage at other time periods among one-frame time period.

Source driver 210 is connected to a plurality of source lines 207. Source driver 210 applies a data signal corresponding to the image to be displayed through the plurality of source lines 207 and the TFT disposed in each pixel. The TFT disposed in each pixel is described later.

Common line driving circuit 211 is connected to a plurality of common lines 208. Common line driving circuit 211 outputs a common line driving signal to each common line 208. The common line driving signal is a pulse signal in which a low level is a potential COM while a high level is a potential Tx. The common line driving signal is described later.

Sensor signal detecting circuit 204 is connected to each sensor signal detection line 202. Sensor signal detecting circuit 204 detects a voltage at each connected sensor signal detection line 202.

An outline of a display operation performed with the panel having the above configuration will be described below. Gate driver 209 outputs the gate signal to a gate of the TFT disposed in each pixel through gate line 206. On the basis of an input video signal, source driver 210 outputs the data signal corresponding to the video signal to the TFT to which the gate signal is output, through source line 207. The data signal is applied to pixel electrode 301 through the TFT. Common line driving circuit 211 outputs the common line driving signal to common line 208. When the data signal is applied to the pixel electrode, a potential difference is generated between the pixel electrode and common line 208 according to the data signal.

Thus, source driver 210 controls the potential difference, thereby controlling an orientation of a liquid crystal molecule of a liquid crystal material (not illustrated) inserted between the pixel electrode and common line 208. At this point, because light is guided from backlight 103 to the liquid crystal material, the orientation of the liquid crystal molecule is controlled to adjust a light amount from backlight 103, and resultantly the image is displayed.

An outline of the touch detecting operation performed with the panel having the above configuration will be described below. Common line driving circuit 211 sequentially outputs the common line driving signals having different timings each other to common lines 208 As illustrated in FIG. 2, common line 208 and sensor signal detection line 202 are disposed while facing each other with upper glass substrate 201 interposed therebetween, and an electrostatic capacitance is formed between common line 208 and sensor signal detection line 202. Therefore, when the potential at common line 208 changes, the electrostatic capacitance changes, thereby changing the potential at sensor signal detection line 202. Sensor signal detecting circuit 204 detects a change amount of the potential at sensor signal detection line 202 according to a timing of changing the potential at the common line driving signal.

A conductive member such as a finger and a pen comes into contact with each sensor signal detection line 202 to change the change amount of the potential at sensor signal detection line 202. On the basis of the change amount, sensor signal detecting circuit 204 detects sensor signal detection line 202 with which the conductive member contacts, from a plurality of sensor signal detection lines 202, thereby detecting a position in a direction perpendicular to sensor signal detection line 202. Common line driving circuit 211 sequentially inputs the common line driving signals having different timings each other in each common line 208, and sensor signal detecting circuit 204 detects a position in a direction parallel to sensor signal detection line 202 on the basis of the timing.

As described above, in the first exemplary embodiment, common line 208 is disposed between upper glass substrate 201 and lower glass substrate 205, and used in both the sensor driving electrode as the touch panel and the common electrode as the display device. The timing of the common line driving signal output from common line driving circuit 211 is described in detail later. Because a method in which sensor signal detecting circuit 204 detects the change in potential at sensor signal detection line 202 is similar to a conventional technology, the description is omitted.

Figure 3:
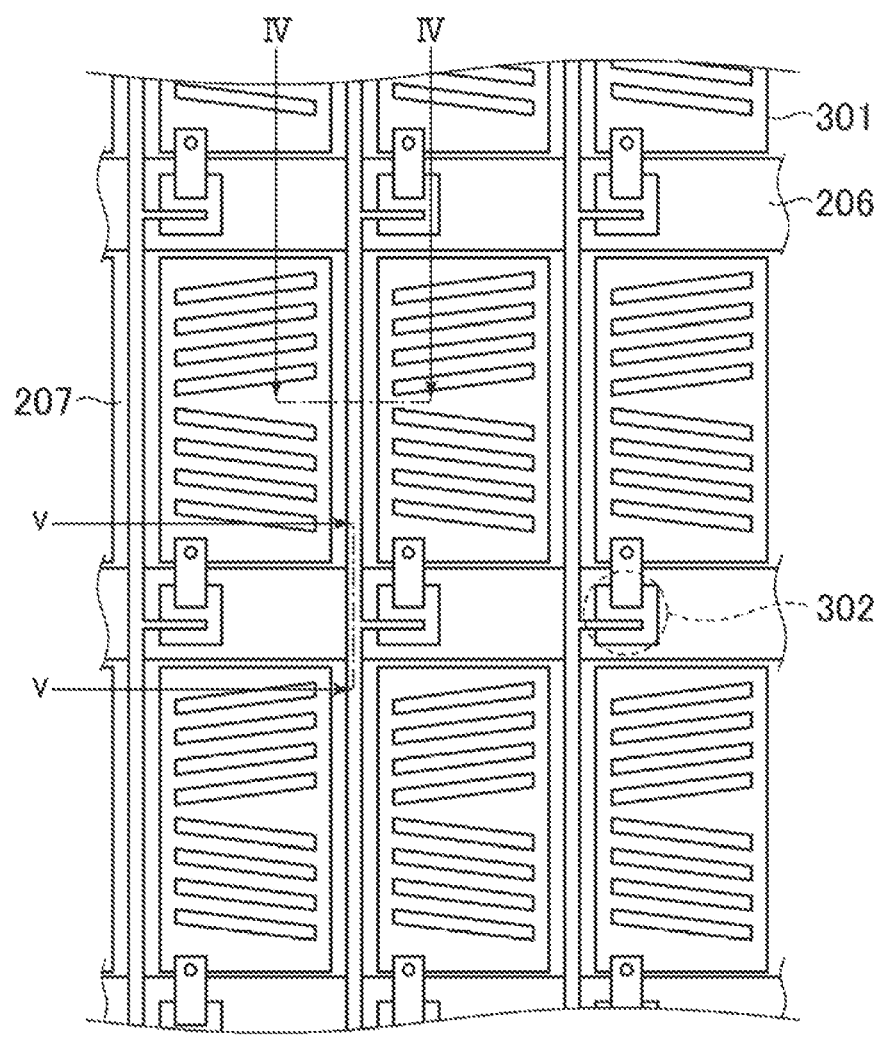
FIG. 3 is a plain view illustrating a schematic configuration of cell according to the first exemplary embodiment of the present disclosure.

FIG. 3 is a plan view illustrating a part of a region where gate lines 206 and source lines 207 of the panel in FIG. 2 are arranged while crossing each other. As illustrated in FIG. 3, a plurality of pixels sectioned by gate lines 206 and source lined 207 are two-dimensionally arranged in the panel. FIG. 3 is a plan view of an IPS (In Plane Switching) type panel 200 by way of example. In each pixel, pixel electrodes 301 including slits are arranged, and pixel electrodes 301 are connected to source line 207 through TFT 302. A gate of TFT 302 is connected to gate line 206, one of a source and a drain is connected to source line 207, and the other is connected to pixel electrode 301.

In the example of FIG. 3, the linear slits are formed in two directions. Alternatively the slit may be formed into another shape. For example, in the linear slits formed in the two directions, a part of the slit may be formed so as to be bent. For example, the slit may be formed into a chevron shape, or any shape as long as the liquid crystal molecule is rotated in two directions in a unit of one or a plurality of pixels.

Figure 4:
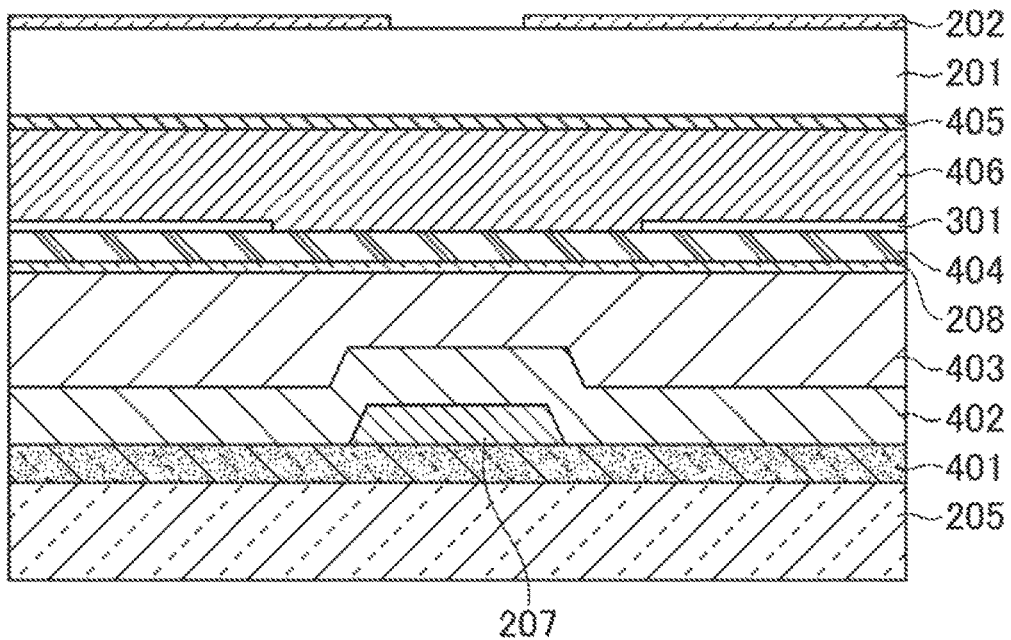
FIG. 4 is a cross sectional view illustrating a schematic configuration of cell according to the first exemplary embodiment of the present disclosure.

An example of a section of the panel will be described below with reference to FIGS. 4 and 5. FIG. 4 is a sectional view taken on a line IV-IV in FIG. 3, and illustrates a section in two adjacent pixel regions across source line 207. Similarly FIG. 5 is a sectional view taken on a line V-V in FIG. 3, and illustrates a section in a region where source line 207 is disposed across gate line 206.

As illustrated in FIG. 4, in the region where source line 207 is disposed, gate insulator 401, source line 207, PAS (Passivation) layer 402, organic PAS layer 403, common line 208, and interlayer insulator 404 are disposed in the order from lower glass substrate 205 toward upper glass substrate 201. For example, PAS layer 402 and interlayer insulator 404 are made of SiN. In the region where source line 207 is not disposed, gate insulator 401, PAS layer 402, organic PAS layer 403, common line 208, interlayer insulator 404, and pixel electrode 301 are disposed in the order from lower glass substrate 205 toward upper glass substrate 201.

Color filter 405 is disposed on one side of upper glass substrate 201 facing lower glass substrate 205. In the region where the source line 207 is not disposed, sensor signal detection line 202 is disposed on the other side of upper glass substrate 201. Liquid crystal layer 406 is disposed between pixel electrode 301 and color filter 405.

Figure 5:
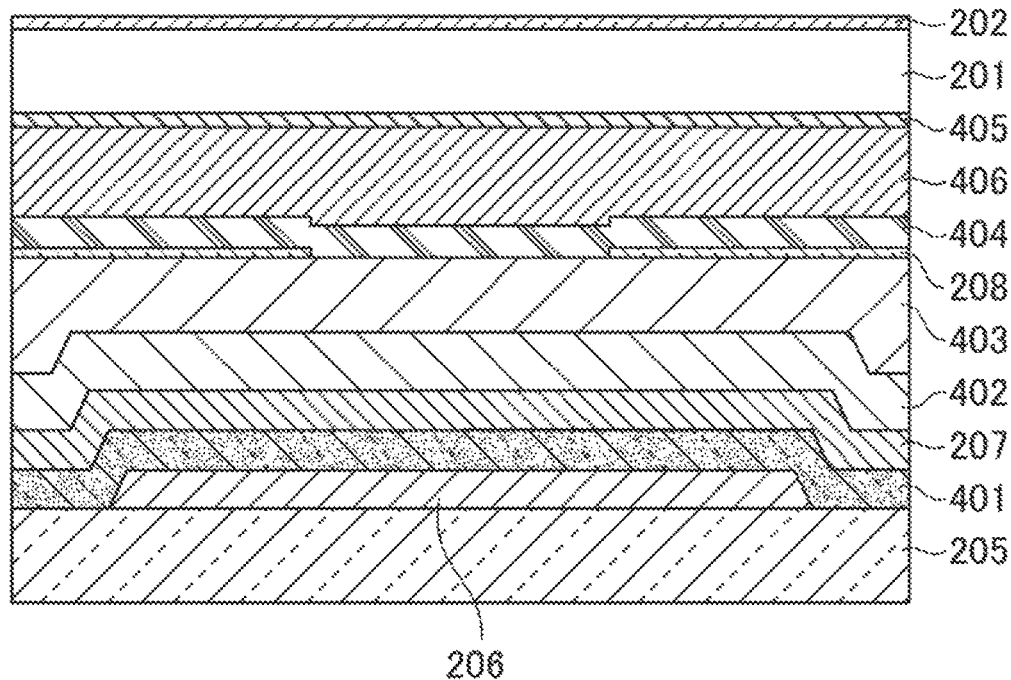
FIG. 5 is a cross sectional view illustrating a schematic configuration of cell according to the first exemplary embodiment of the present disclosure.

Similarly, as illustrated in FIG. 5, in a central region of gate line 206, gate line 206, gate insulator 401, source line 207, PAS layer 402, organic PAS layer 403, and interlayer insulator 404 are disposed in the order from lower glass substrate 205 toward upper glass substrate 201. In the region at an end of gate line 206 on lower glass substrate 205, gate line 206, gate insulator 401, source line 207, PAS layer 402, organic PAS layer 403, common line 208, and interlayer insulator 404 are disposed in the order toward upper glass substrate 201.

Color filter 405 is disposed on one side of upper glass substrate 201 facing lower glass substrate 205. On the other hand, sensor signal detection line 202 is disposed on the other side of upper glass substrate 201. Liquid crystal layer 406 is disposed between pixel electrode 301 and color filter 405.

Thus, in section IV-IV, while common line 208 is seamlessly disposed, sensor signal detection line 202 is disposed with a predetermined gap. On the other hand, in section V-V, while common line 208 is disposed with a predetermined gap, sensor signal detection line 202 is seamlessly disposed.

FIGS. 4 and 5 illustrate the sectional configurations by way of example. The first exemplary embodiment is not limited to the sectional configurations in FIGS. 4 and 5. For example, the panel may have a VA (Vertical Alignment) type sectional configuration.

Figure 6:
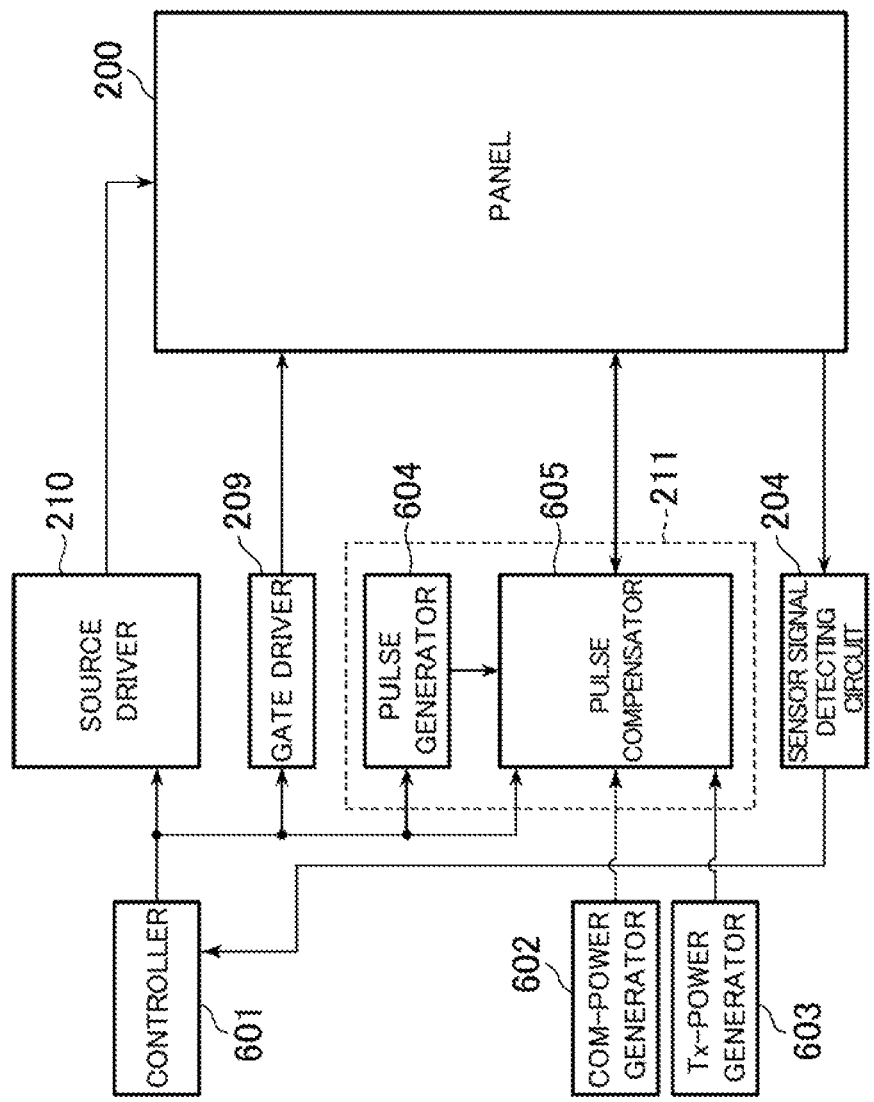
FIG. 6 is a view illustrating a functional configuration according to the first exemplary embodiment of the present disclosure.

An outline of a functional configuration of display device 100 integrally provided with the touch detecting function will be described below. As illustrated in FIG. 6, display device 100 integrally provided with the touch detecting function functionally includes controller 601, source driver 210, gate driver 209, COM-power generator 602, Tx-power generator 603, common line driving circuit 211, sensor signal detecting circuit 204, and panel 200.

Controller 601 controls each circuit. Specifically, for example, controller 601 outputs a control signal to gate driver 209, source driver 210, and common line driving circuit 211, thereby controlling each circuit. Controller 601 receives a signal output from the sensor signal detecting circuit, and performs pieces of processing such as calculation of a touch coordinate and noise reduction.

Controller 601 may include one circuit or a plurality of circuits. For example, a circuit that inputs the control signal to gate driver 209 and source driver 210 and a circuit that inputs the control signal to the sensor signal driving circuit may separately be provided. For example, a circuit that processes the signal output from the sensor signal detecting circuit may separately be provided. However, in the case that controller 601 incudes a plurality of circuits, it is necessary to provide a circuit and a wiring in order to synchronize the circuits with one another.

COM-power generator 602 generates potential COM. Potential COM is a potential that forms an electric field applied to liquid crystal layer 406 disposed in each pixel together with the data signal when the data signal is applied to each pixel electrode 301. Tx-power generator 603 generates potential Tx.

As described above with reference to FIG. 2, sensor signal detecting circuit 204 detects the position with which a finger or the like touches on the basis of the signal acquired from sensor signal detection line 202 of panel 200 and the control signal of controller 601.

Common line driving circuit 211 functionally includes pulse generator 604 and pulse compensator 605. On the basis of the control signal of the controller 601, pulse generator 604 generates signal Tx that is of the pulse signal in order to sequentially output signal Tx to the plurality of common lines 208.

Pulse compensator 605 is connected to controller 601, pulse generator 604, COM-power generator 602, and Tx-power generator. On the basis of signal Tx input from pulse generator 604 and the potential input from a whole or part of each common line 208, pulse compensator 605 generates each common line driving signal reducing the variation in potential at common line 208 due to the change in potential at source line 207. Pulse compensator 605 outputs each common line driving signal to corresponding common line 208.

Figure 7:
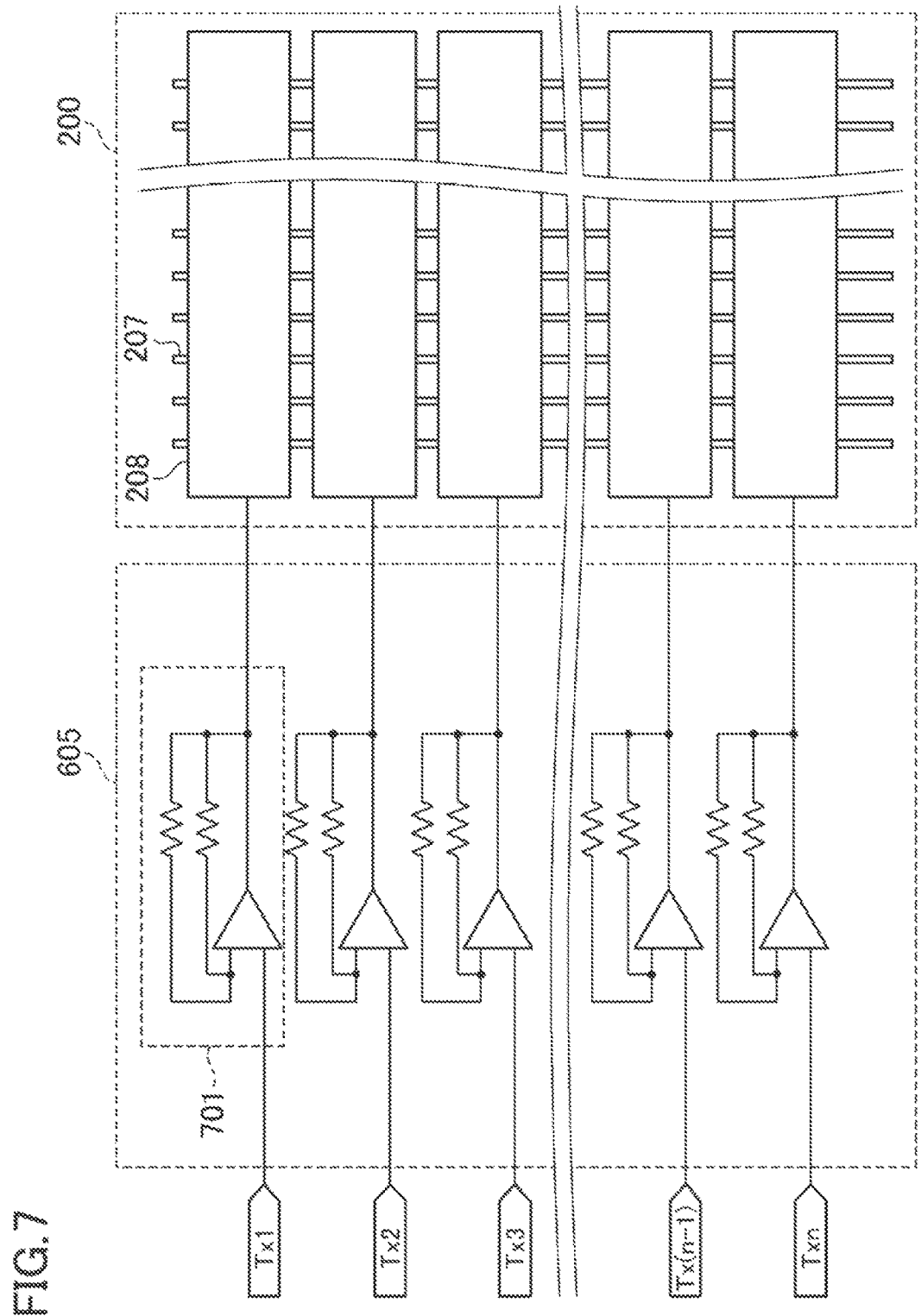
FIG. 7 is a view illustrating a schematic configuration of a pulse compensator and a panel according to the first exemplary embodiment of the present disclosure.

Specific configuration and operation of pulse compensator 605 will be described below with reference to FIG. 7. As illustrated in FIG. 7, for example, pulse compensator 605 includes n operational amplifier circuits 701 corresponding to n common lines 208. Each operational amplifier circuit 701 includes one operational amplifier and two resistors. Each of the resistors included in operational amplifier circuit 701 is connected in parallel to a negative-side terminal and an output terminal of the operational amplifier, a positive-side terminal of each operational amplifier is connected to pulse generator 604, and the output terminal of each operational amplifier is connected to corresponding common line 208 of the panel.

As described above, in the first exemplary embodiment, each operational amplifier circuit 701 is an inversion amplifier circuit. Specifically, for example, corresponding signals Tx1 to Txn are input from pulse generators 604 to the positive-side terminals of operational amplifier circuits 701. The corresponding potentials at common lines 208 are input to the negative-side terminals through the resistors. Each common line driving signal, in which the signal corresponding to the potential in which the variation in potential at common line 208 is inverted is added to signal Tx, is output to corresponding common line 208 from the output terminal of the operational amplifier.

In the first exemplary embodiment, pulse compensator 605 includes the inversion amplifier circuit as illustrated in FIG. 7. Alternatively, pulse compensator 605 may have another configuration including a circuit except for the inversion amplifier circuit as long as the configuration has the action and effect similar to those of the inversion amplifier circuit.

Figure 8:
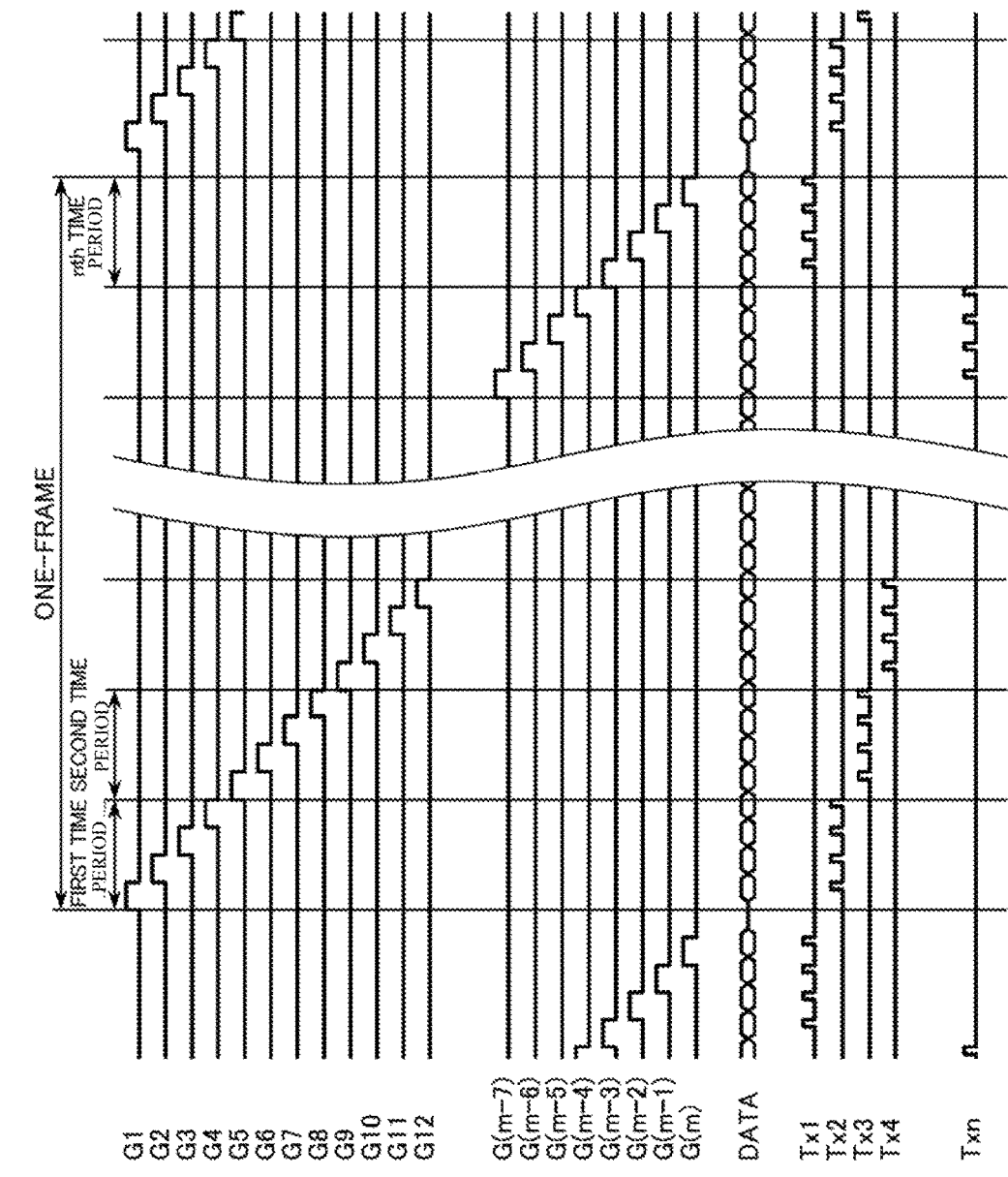
FIG. 8 is a timing chart according to the first exemplary embodiment of the present disclosure.

A time-series relationship between signal Tx and the data signal will be described below with reference to FIG. 8. FIG. 8 is a timing chart illustrating time-dependent potential changes of signals G1 to Gm, the data signal, and signals Tx1 to Txn. Hereinafter, a time period during which signals G1 to Gm make one round is referred to as a one-frame time period. The one-frame time period is divided into n time periods, a time period including a time period during which signal G1 becomes a high potential is referred to as a first time period, and time periods subsequent to the first time period are referred to as second to nth time periods. It is assumed that each of the first to nth time periods corresponds to about four time the time period during which the high potential is input to gate line 206. Each four gate lines 206 are disposed according to one common line 208.

As illustrated in FIG. 8, gate driver 209 sequentially outputs signals G1 to G(m) to m gate lines 206. Source driver 210 outputs the data signal to each source line 207. Similarly, Tx driver sequentially outputs signals Tx1 to Txn to n common lines. Signal Tx includes four pulses at each time period (for example, the first time period) among the one-frame time period.

In FIG. 8, signals G1 to Gm are the gate signals output from gate driver 209. Specifically, for example, the pulses of signals G1 to Gm are sequentially output to m gate lines 206. m may be different from or equal to n.

The data signal is a signal output from source driver 210. Originally, a number of data signals corresponds to a number of source lines 207 arranged on the panel. However, for convenience, only one data signal is illustrated in FIG. 8.

Signals Tx1 to Txn are pulse signals including the pulses at one of the time periods that do not overlap each other among the first to nth time periods. Specifically, for example, signal Tx1 is the pulse signal including four pulses at the nth time period. Similarly, signals Tx2 to Txn are the pulse signals including four pulses at the first to (n−1)th time periods.

Signals Tx1 to Txn may include the pulses only at one corresponding time period in the first to nth time periods, and the order of signals Tx1 to Txn does not matter. FIG. 8 illustrates the example in which each of signals Tx1 to Txn includes the four pulses at the time period. Alternatively, the number of pulses needs not to be four.

The pulses included in each of signals Tx1 to Txn are included in the time period different from the time period in which the pulses are included in the gate signal corresponding to each signal Tx. Specifically, for example, signal Tx1 includes the pulses at the nth time period. Therefore, the common line driving signal based on signal Tx1 includes the pulses at the nth time period as described with reference to FIG. 7. Similarly each of signals Tx2 to Txn includes the pulses at the time period different from the time period in which the pulses are included in the gate signal corresponding to each signal Tx. On the other hand, common lines 208 to which the common line driving signal is input are disposed according to gate lines 206 to which signals G1 to G4 are input, and signals G1 to G4 include the pulses at the first time period.

Figure 9:
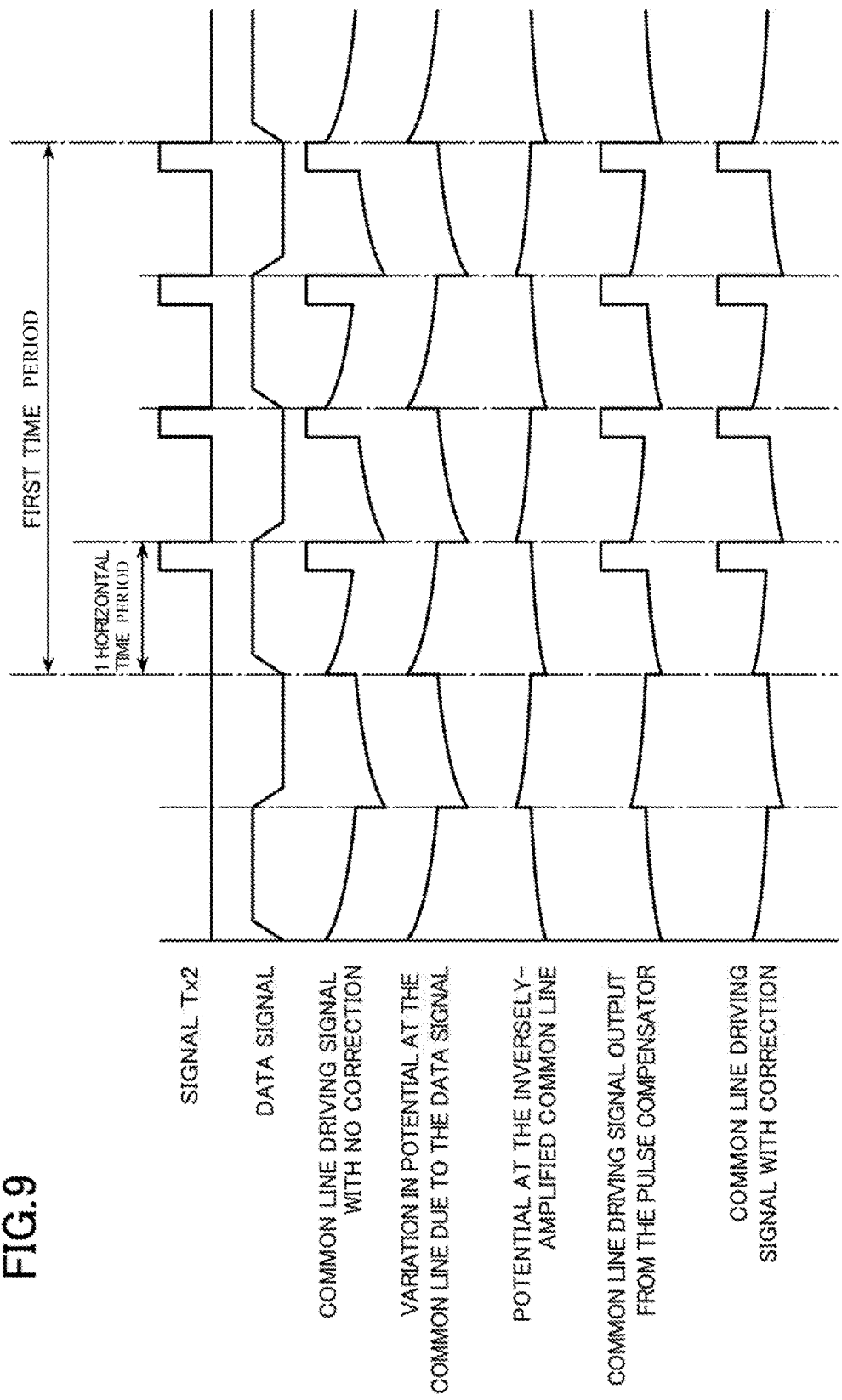
FIG. 9 is a waveform chart according to the first exemplary embodiment of the present disclosure.

The effect of the first exemplary embodiment will be described below with reference to FIG. 9. FIG. 9 illustrates an example of a waveform of the common line driving signal input to common line 208 at the time periods before and after the first time period.

In FIG. 9, "signal Tx2" expresses the signal generated with pulse generator 604. "The data signal" expresses the signal output from source driver 210 to source line 207. "The common line driving signal with no correction" expresses the common line driving signal on the common line in the case of being independent of the first exemplary embodiment. "The variation in potential at the common line due to the data signal" expresses a potential variation that is provided to the signal of common line 208 through a parasitic capacitance between source line 207 and common line 208 by the data signal input to source line 207. "The potential at the inversely-amplified common line" expresses a signal in which the potential variation is inversely-amplified, the signal being generated with operational amplifier circuit 701 to which the potential variation of common line 208 is input. "The common line driving signal output from the pulse compensator" expresses the common line driving signal of the first exemplary embodiment before the common line driving signal is input to common line 208 and after the common line driving signal is output to pulse compensator 605. "The common line driving signal with correction" expresses the common line driving signal on common line 208 in the first exemplary embodiment.

The waveform of the common line driving signal in the first exemplary embodiment will be described below. For the first exemplary embodiment, as described above, "signal Tx2" is converted into the common line driving signal through pulse compensator 605, and input to common line 208.

Specifically, for example, as described above with reference to FIG. 7, "the variation in potential at the common line due to the data signal" is fed back and input to the inversion amplifier circuit. On the basis of "the variation in potential at the common line due to the data signal", the inversion amplifier circuit generates "the potential at the inversely-amplified common line" expressing the signal in which the potential variation is inversely-amplified.

The inversion amplifier circuit also outputs the common line driving signal expressing "the common line driving signal output from the pulse compensator", to the common line 208, the common line driving signal having the waveforms of "input signal Tx2" and "the potential at the inversely-amplified common line" are added to each other. Therefore, "the potential at the inversely-amplified common line", which is input to common line 208 and included in "the common line driving signal output from the pulse compensator" reduces the influence of "the variation in potential at the common line due to the data signal". Specifically, as illustrated in FIG. 9, the waveform of the common line driving signal on common line 208 becomes that of "the common line driving signal with correction", and it is found that the waveform of the common line driving signal is smoothed in timing immediately before the pulse, compared to the common line driving signal with no correction. Therefore, the touch can more effectively be detected.

In "the common line driving signal with correction", the potential variation occurs due to "the data signal" in timing of starting each horizontal time period. However, because the touch is detected at the time period in which signal Tx includes the pulses, the effect can be obtained when the waveform of the common line driving signal is flattened in timing immediately before the pulse. The data signal is cited as an example of a cause to provide the noise to the common line driving signal input to common line 208. However, the cause is not limited to the data signal.

The first exemplary embodiment can provide the low-profile, high-detection-accuracy display device integrally provided with the touch detecting function.

The first exemplary embodiment is not limited to the above configuration, but various modification can be made. For example, the configuration of pulse compensator 605 may be replaced for a configuration that obtains the same action and effect as the inversion amplifier circuit or a configuration that can achieve the same purpose.

Second Exemplary Embodiment

A second exemplary embodiment of the present disclosure will be described below. The second exemplary embodiment differs from the first exemplary embodiment in that pulse compensator 605 stops the operation to add each signal in which the potential variation of common line 208 is inverted, to signal Tx at a detection time period in which the touch is detected. Therefore, in the second exemplary embodiment, power consumption can be reduced compared to the first exemplary embodiment. Because other configurations of the second exemplary embodiment are similar to those of the first exemplary embodiment, the overlapping description is omitted.

Figure 10:
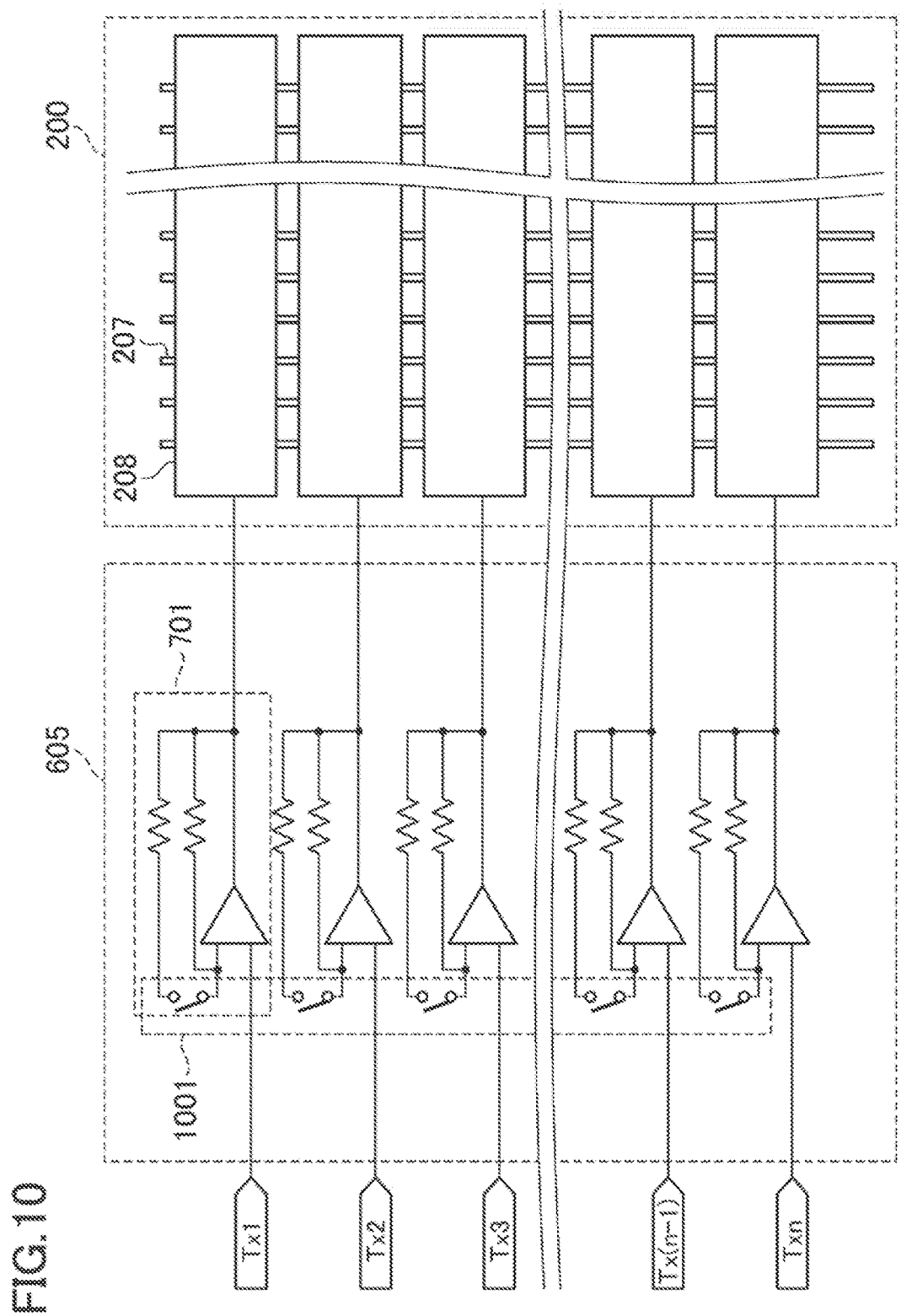
FIG. 10 is a view illustrating a schematic configuration of a pulse compensator and a panel according to a second exemplary embodiment of the present disclosure.

FIG. 10 is a view illustrating examples of panel 200 and pulse compensator 605 of display device 100 according to the second exemplary embodiment, display device 100 being integrally provided with the touch detecting function. FIG. 10 corresponds to FIG. 7 illustrating display device 100 according to the first exemplary embodiment, display device 100 being integrally provided with the touch detecting function.

As illustrated in FIG. 10, unlike the first exemplary embodiment, in the second exemplary embodiment, circuit selector switch 1001 is provided between one of the two resistors included in each operational amplifier circuit 701 of pulse compensator 605 and the negative-side terminal of the operational amplifier. Because other configurations are similar to those of the first exemplary embodiment, the description is omitted.

An operation of display device 100 integrally provided with the touch detecting function will be described below. In the second exemplary embodiment, controller 601 changes circuit selector switch 1001, operational amplifier circuit 701 acts as the inversion amplifier circuit at the time period during which the touch is not detected, and operational amplifier circuit 701 acts as a voltage follower at the time period during which the touch is detected. In the case that operational amplifier circuit 701 acts as the voltage follower, the power consumption of operational amplifier circuit 701 is reduced compared to the case that operational amplifier circuit 701 acts as the inversion amplifier circuit. Accordingly, in the second exemplary embodiment, the low-profile, high-detection-accuracy display device integrally provided with the touch detecting function can be provided, and the power consumption of display device 100 integrally provided with the touch detecting function can be reduced.

Specifically, operational amplifier circuit 701 acts as the inversion amplifier circuit similarly to the first exemplary embodiment in the case that circuit selector switch 1001 is in an on state. On the other hand, in the case that circuit selector switch 1001 is in an off state, because one of the two resistors and the negative-side terminal of the operational amplifier are separated from each other, operational amplifier circuit 701 acts as the voltage follower, which has the power consumption lower than the inversion amplifier circuit. On and off of circuit selector switch 1001 are controlled on the basis of the control signal of controller 601.

Figure 11:
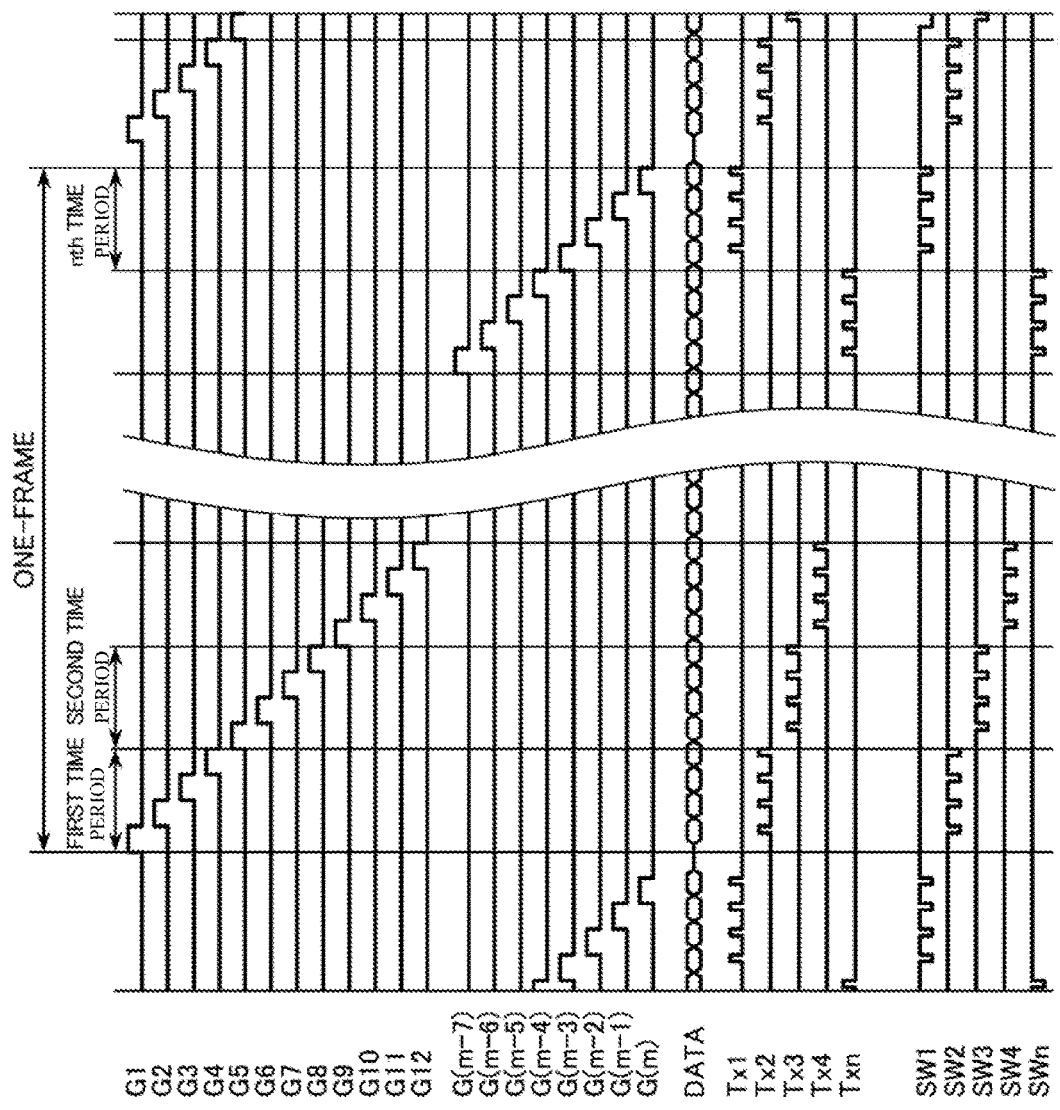
FIG. 11 is a timing chart according to the second exemplary embodiment of the present disclosure.

An example of timing of turning on and off circuit selector switch 1001 will be described below. FIG. 11 is a timing chart illustrating timing of each of signals G1 to Gm, the data signal, signals Tx1 to Txn, and signals SW1 to SWn. A state in which signals SW1 to SWn are in the high potential expresses the on state of circuit selector switch 1001, and a state in which signals SW1 to SWn are in the low potential expresses the off state of circuit selector switch 1001. Circuit selector switches 1001 included in operational amplifier circuits 701 to which signals Tx1 to Txn are input correspond to signals SW1 to SWn, respectively.

As illustrated in FIG. 11, signals SW1 to SWn are the signals in which corresponding signals Tx1 to Txn are inverted. When signal Tx is in the high potential, operational amplifier circuit 701 acts as the voltage follower, which has the power consumption lower than the inversion amplifier circuit. Therefore, operational amplifier circuit 701 acts as the inversion amplifier circuit only at the time period necessary for the detection, and acts as the voltage follower at the time period during which signal Tx necessary for the detection is not output, thereby reducing the power consumption.

The second exemplary embodiment is not limited to the above configuration, but various modification can be made. For example, the following modification may be made.

In circuit selector switch 1001 of the second exemplary embodiment, TFT 302 that does not correspond to the pixel electrode may be put into the off state at a part of the time period during which the voltage based on the data signal and the potential at common line 208 is applied to each pixel. TFT 302 that does not correspond to the pixel electrode expresses TFT 302 that does not apply the data signal to the pixel electrode on the basis of common line 208 connected to operational amplifier circuit 701 including circuit selector switch 1001.

Figure 12:
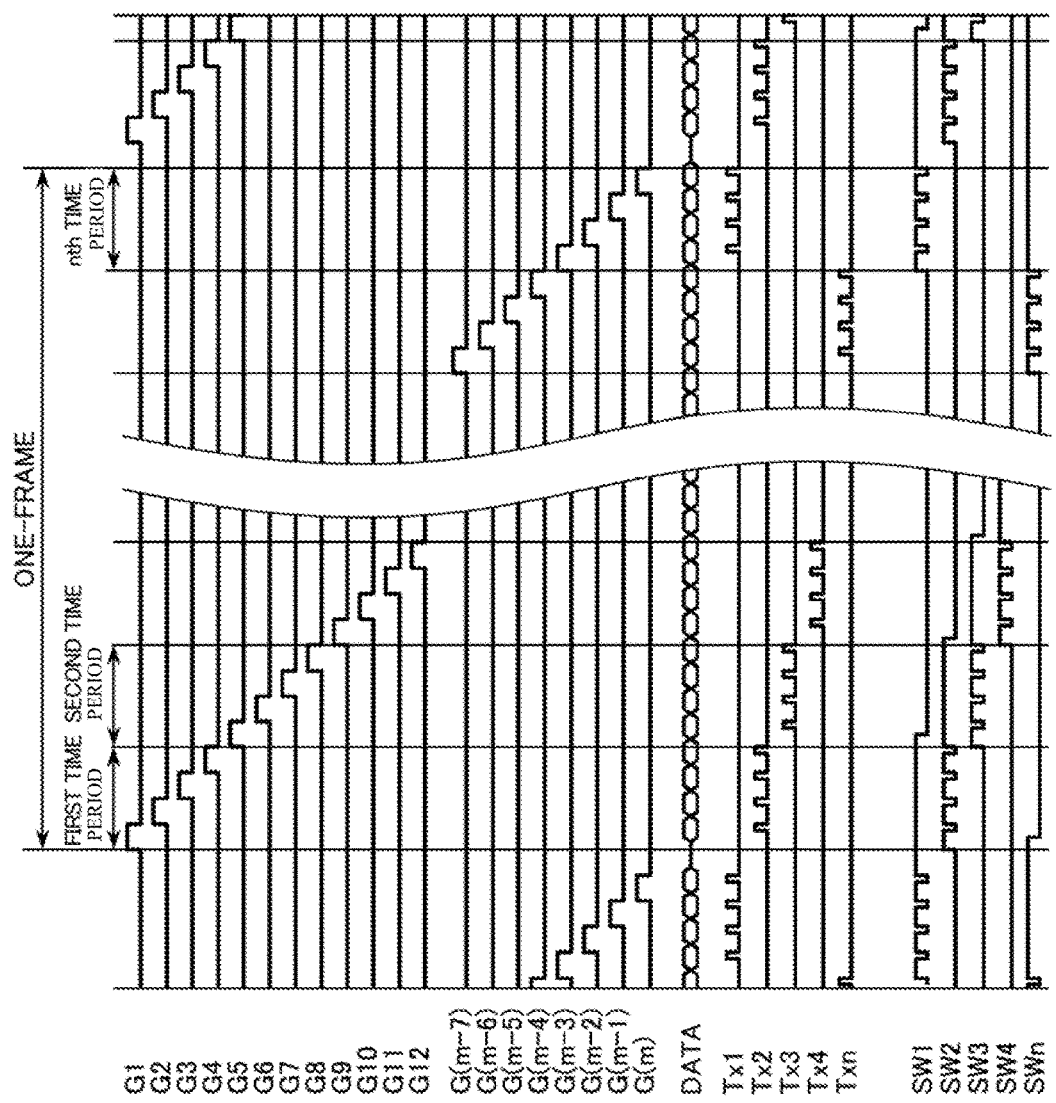
FIG. 12 is another timing chart according to the second exemplary embodiment of the present disclosure.

For example, circuit selector switch 1001 may be turned on and off according to a timing chart in FIG. 12. As illustrated in FIG. 12, signals SW1 to SWn are signals that become the high potential at the time period in which signal Tx corresponding to each signal SW includes the pulses in the first to nth time periods in addition to the description with reference to FIG. 11. Additionally, signals SW1 to SWn are signals that also become the high potential at the time period in which the gate signal corresponding to each signal SW includes the pulses and a time period next to the time period in which the gate signal corresponding to each signal SW includes the pulses.

Specifically, for example, signal SW1 is a signal that is in the low potential except for the nth time period in which signal Tx1 corresponding to signal SW1 includes the pulses, the first time period in which signals G1 to G4 include the pulses, and the second time period. As illustrated in FIG. 12, signal SW1 may be changed to the low potential in the middle of the second time period. In the modification, the power consumption can further be reduced by lengthening the time period during which operational amplifier circuit 701 acts as the voltage follower.

The timing charts are illustrated in FIGS. 11 and 12 only by way of example, and circuit selector switch 1001 may be turned on and off on the basis of another timing chart.

Third Exemplary Embodiment

A third exemplary embodiment of the present disclosure will be described below. The third exemplary embodiment differs from the first and second exemplary embodiments in that panel 200 includes display region 1301 and detection region 1302 different from display region 1301. Pulse compensator 605 outputs the common line driving signal on the basis of the potential input from each of common lines 208 arranged in detection region 1302. As used herein, display region 1301 means a region where the pixel and TFT 302 are disposed, the region being sectioned by source lines 207 and gate lines 206. Detection region 1302 differs from display region 1301, and detection region 1302 is a region where each source line 207 and a part of the plurality of common lines 208 intersect with each other Because other configurations of the third exemplary embodiment are similar to those of the second exemplary embodiment, the overlapping description is omitted.

Figure 13:
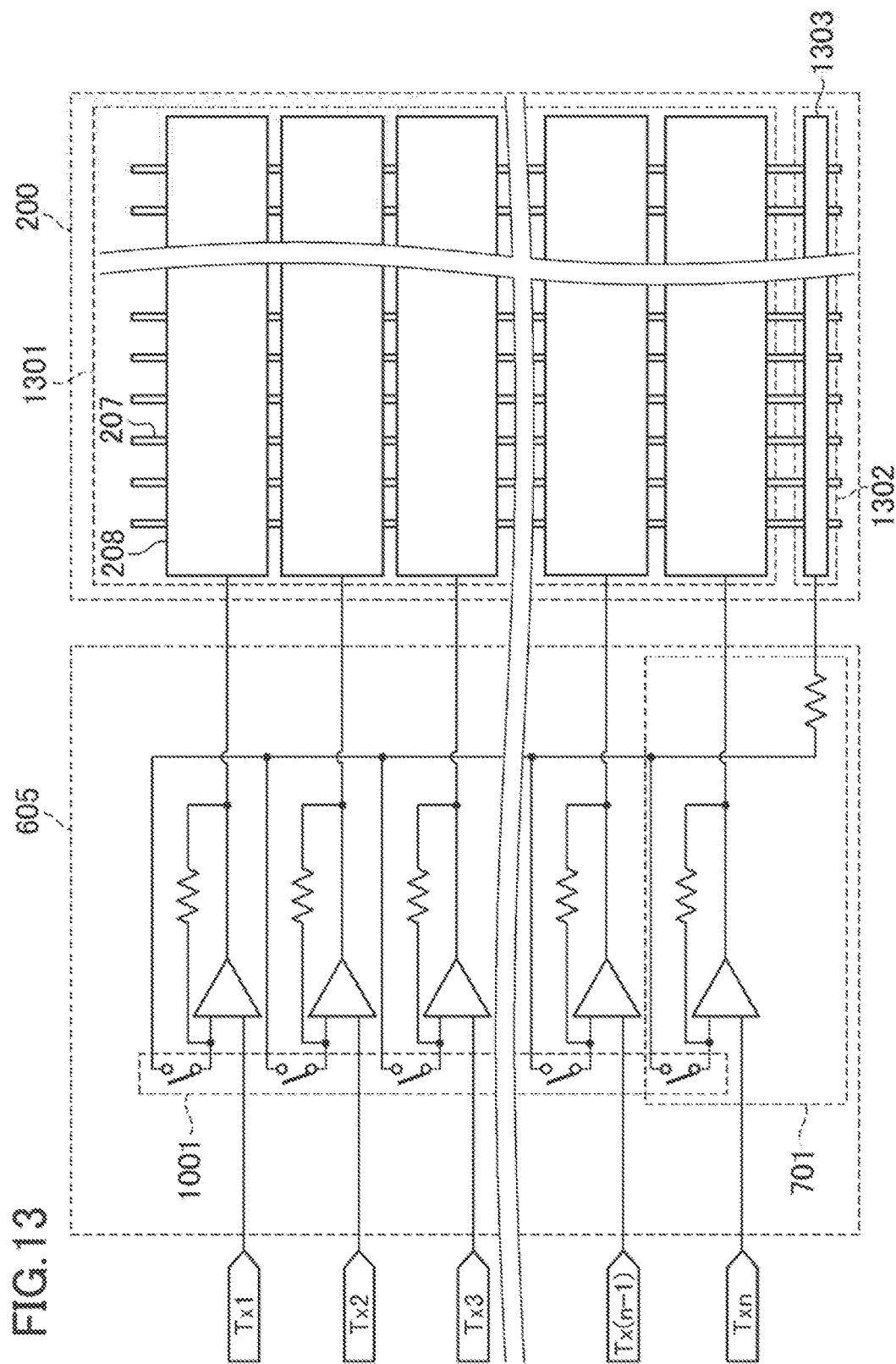
FIG. 13 is a view illustrating a schematic configuration of a pulse compensator and a panel according to a third exemplary embodiment of the present disclosure.

FIG. 13 is a view illustrating examples of panel 200 and pulse compensator 605 of display device 100 according to the third exemplary embodiment, display device 100 being integrally provided with the touch detecting function. FIG. 13 corresponds to FIG. 10 illustrating display device 100 according to the second exemplary embodiment, display device 100 being integrally provided with the touch detecting function.

As illustrated in FIG. 13, unlike the second exemplary embodiment, in the third exemplary embodiment, detection-only electrode 1303 dedicated to detection of the variation in potential at the source electrode is disposed in detection region 1302. One of the two resistors included in operational amplifier circuit 701 is shared by operational amplifiers 701.

Detection-only electrode 1303 is connected to the resistor shared by operational amplifier circuits 701 included in pulse compensator 605. Each operational amplifier circuit 701 included in pulse compensator 605 includes one resistor and the operational amplifier, and the negative-side terminal of each operational amplifier is connected to the shared resistor through circuit selector switch 1001. Detection-only electrode 1303 may have a size different from that of each common line 208 arranged in display region 1301.

In operational amplifier circuit 701, the shared resistor is connected to the negative-side terminal of the operational amplifier while circuit selector switch 1001 is in the on state. Accordingly, the potential at dedicated common line 208 is fed back and input to operational amplifier circuit 701 to which the shared resistor is connected, and operational amplifier circuit 701 can reduce the variation in potential at the output common line driving signal. The operational amplifier circuit to which the shared resistor is not connected acts as the voltage follower.

In the third exemplary embodiment, the resistor is shared by operational amplifier circuits 701. Therefore, the necessity of one resistor disposed in each operational amplifier circuit 701 is eliminated compared to the second exemplary embodiment. Circuit selector switch 1001 sequentially connects the shared resistor to operational amplifier circuits 701, and operational amplifier circuit 701 acts as the inversion amplifier circuit at the time period during which operational amplifier circuits 701 is connected to the shared resistor. Therefore, the waveform of the common line driving signal can be smoothed similarly to the second exemplary embodiment. Accordingly, in the third exemplary embodiment, the configuration of pulse compensator 605 can be simplified in addition to the effect similar to the second exemplary embodiment, and the low-profile, high-detection-accuracy display device integrally provided with the touch detecting function can be provided.

The configuration of the third exemplary embodiment is not limited to the configuration in FIG. 13, but the configuration of the third exemplary embodiment may be replaced for a configuration that obtains the substantially same action and effect as the configuration in FIG. 13 or a configuration that can achieve the same purpose.

Fourth Exemplary Embodiment

A fourth exemplary embodiment of the present disclosure will be described below. The fourth exemplary embodiment differs from the third exemplary embodiment in that pulse compensator 605 includes signal selector 1401 and output selector 1402. Signal selector 1401 and output selector 1402 are described later.

In the fourth exemplary embodiment, pulse compensator 605 includes signal selector 1401 and output selector 1402, so that the configuration of pulse compensator 605 can be simplified compared to the third exemplary embodiment. Because other configurations of the fourth exemplary embodiment are similar to those of the third exemplary embodiment, the overlapping description is omitted.

Figure 14:
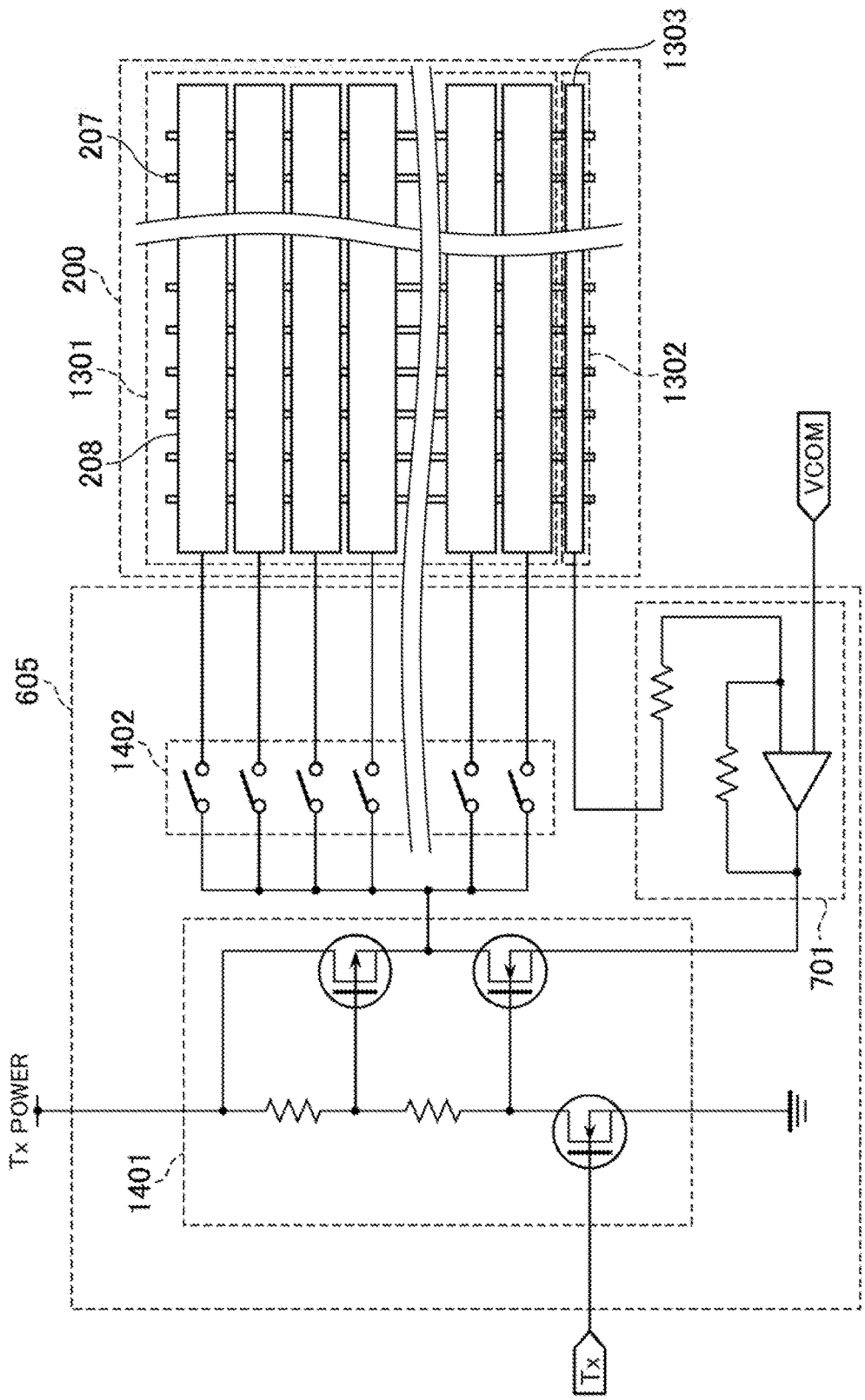
FIG. 14 is a view illustrating a schematic configuration of a pulse compensator and a panel according to a third exemplary embodiment of the present disclosure.

The configuration of the fourth exemplary embodiment will be described below with reference to FIG. 14. FIG. 14 is a view illustrating examples of panel 200 and pulse compensator 605 of display device 100 according to the fourth exemplary embodiment, display device 100 being integrally provided with the touch detecting function. FIG. 14 corresponds to FIG. 13 illustrating display device 100 according to the third exemplary embodiment, display device 100 being integrally provided with the touch detecting function.

As illustrated in FIG. 14, pulse compensator 605 includes operational amplifier circuit 701, signal selector 1401, and output selector 1402. Because operational amplifier circuit 701 is similar to the first to third exemplary embodiments, the description is omitted.

Signal selector 1401 includes two resistors, two Nch FETs (N-channel Field Effect Transistors), and one Pch FET (P-channel Field Effect Transistor). A source terminal of one of the Nch FETs is grounded, a gate terminal is connected to pulse generator 604, and a drain terminal is connected to a gate terminal of the other Nch FET and one of the resistors. A source terminal of the other Nch FET is connected to the output terminal of the operational amplifier of operational amplifier circuit 701, and a drain terminal is connected to a source terminal of the Pch FET and output selector 1402. A gate terminal of the Pch FET is connected to the two resistors, and a drain terminal is connected to one of the resistors and Tx-power generator 603.

The outputs of output selector 1402 correspond to common lines 208 arranged in display region 1301, and the input includes switches connected to signal selector 1401. The switches are turned on and off in response to the control signal from controller 601.

An operation of each unit of the fourth exemplary embodiment will be described below. On the basis of each signal Tx, signal selector 1401 selects the outputs of operational amplifier circuit 701 at one of the time period during which signal Tx is in the low and high potentials. At the other time period, signal selector 1401 selects the signal corresponding to the potential, which is different from the potential output from operational amplifier circuit 701 at one of the time periods, on the basis of a power supply in the high or low potential. Specifically, for example, in the case that input signal Tx is in the high potential, in signal selector 1401, the Nch FET to which signal Tx is input and the Pch FET become the on state, and the Nch FET connected to operational amplifier circuit 701 becomes the off state. Accordingly, signal selector 1401 outputs power Tx to output selector 1402.

On the other hand, in the case that input signal Tx is in the low potential, in signal selector 1401, the Nch FET to which signal Tx is input and the Pch FET become the off state, and the Nch FET connected to operational amplifier circuit 701 becomes the on state. Signal selector 1401 outputs the signal input from the operational amplifier of operational amplifier circuit 701 to output selector 1402. Accordingly, an inverted component of the variation in potential at common line 208 is added to the signal output from signal selector 1401 only at the low-potential time period.

Output selector 1402 selects one common line 208 from the plurality of common lines 208 on the basis of the timing of each signal Tx, and outputs the signal selected with signal selector 1401 to selected common line 208. Specifically, for example, the switches included in output selector 1402 are put into the on state at the time period in which the touch with corresponding common line 208 is detected and the time period in which the voltage is applied to the pixel corresponding to common line 208 according to the data signal, and the switches are put into the off state at other time periods. In the fourth exemplary embodiment, the number of operational amplifiers of operational amplifier circuit 701 decreases, so that a circuit area and a frame area can be reduced. In the fourth exemplary embodiment, pulse compensator 605 does not include output selector 1402, but may include signal selector 1401 corresponding to each common line 208.

Although the liquid crystal display device is considered in the above description, the display device may include various light emitting elements such as an organic EL element, an inorganic EL element, and a FED (Field-Emission Device). The present disclosure is not limited to the above exemplary embodiments, but various modification can be made. The configurations described in the exemplary embodiments can be replaced for a configuration that obtains the substantially same action and effect or a configuration that can achieve the same purpose.

The common line described in the claims corresponds to common line 208 and detection-only electrode 1303.

What is claimed is:

1. A display device with built-in touch detection function, the display device comprising:
   a plurality of source lines extending along a first direction;
   a plurality of detection lines extending along the first direction;
   a plurality of common lines extending along a second direction different from the first direction;
   a plurality of gate lines extending along the second direction;
   a plurality of pixels, each pixel among the plurality of pixels receiving a video signal supplied from a corresponding source line among the plurality of source lines according to a video to be displayed;
   a plurality of control elements, each control element applying to a corresponding pixel a voltage based on the video signal and a potential to the plurality of common lines;
   a common line driving circuit including:
      a pulse generator that sequentially drives the plurality of common lines, the pulse generator generating a first pulse signal for each of the plurality of common lines;
      a pulse compensator comprising a plurality of operational amplifier circuits disposed to correspond to the plurality of common lines, each operational amplifier circuit among the plurality of operational amplifier circuits comprising a resistor and an operational amplifier that comprises a negative-side terminal, a positive-side terminal connected to the pulse generator to receive a respective first pulse signal, and an output terminal connected to a corresponding one of the plurality of common lines and supplies a second pulse signal to the corresponding one of the plurality of common lines; and
   a touch detector that detects a position specified by a user according to the second pulse signal,
   wherein the resistor is connected in parallel to the negative-side terminal and the output terminal of the operational amplifier in each operational amplifier circuit among the plurality of operational amplifier circuits.

2. The display device according to claim 1, wherein the pulse compensator generates the second pulse signal according to a signal, wherein the signal is a sum of the first pulse signal and a signal that corresponds to another potential that is a variation in the potential at each of the common lines that is inverted, and outputs the second pulse signal to each corresponding common line.

3. The display device according to claim 2, wherein the pulse compensator stops an operation to add the signal corresponding to the inverted signal to the first pulse signal at a detection time period when the touch detector performs detection.

4. The display device according to claim 3, wherein the pulse compensator stops the operation to add the signal corresponding to the inverted signal to the first pulse signal corresponding to each of the common lines at a part of a time period in which the control element except for each of the control elements corresponding to each of the common lines among the plurality of control elements applies a voltage based on each of the video signals and the potential at each of the common lines to each of the pixels.

5. The display device according to claim 1, wherein the common lines are formed in a second layer between a first layer and a third layer, wherein the detection lines are formed in the first layer, and wherein the source lines are formed in the third layer.

6. The display device according to claim 1, wherein each control element among the plurality of control elements applies a voltage based on each of the video signals and the potential at each of the common lines to each of the pixels at a time period that is different from a detection time period in which the touch detector performs detection based on the second pulse signal input to each of the common lines corresponding to the control element.

7. The display device according to claim 1, further comprising:
   a display region in which each of the pixels and each of the control elements are disposed in a region sectioned by the plurality of source lines and the plurality of gate lines; and
   a detection region that is different from the display region, each of the source lines and a portion of the plurality of common lines being disposed in the detection region while intersecting each other,
   wherein the pulse compensator outputs the second pulse signal based on a potential input from the common line disposed in the detection region.

8. The display device according to claim 1, wherein the pulse compensator includes:
   a signal selector that selects the second pulse signal based on the first pulse signal at a time period in which the first pulse signal is in low and high potentials, and wherein the signal selector selects a signal corresponding to a potential that is different from the potential at the second pulse signal at the time period, based on a power supply that is in one of the low and high potentials, at a different time period; and
   an output selector that selects one of the plurality of common lines based on timing of the first pulse signal, and outputs the signal selected with the signal selector to the selected common line.

9. The display device integrally according to claim 1, wherein the pulse compensator includes a signal selector that selects the second pulse signal at a time period in which the first pulse signal is in low and high potentials based on the first pulse signal corresponding to each of the common lines, and wherein the signal selector selects a signal corresponding to a potential that is different from the potential at the second pulse signal at the time period, based on a power supply that is in one of the low and high potentials at a different time period, and outputs the selected signal to each corresponding common line.

10. The display device according to claim 1, wherein in each operational amplifier circuit among the plurality of the operational amplifier circuits, two resistors are connected in parallel to the negative-side terminal and the output terminal of the operational amplifier.

* * * * *